(12) United States Patent
Tanigawa

(10) Patent No.: US 6,435,232 B2
(45) Date of Patent: Aug. 20, 2002

(54) COOLANT PASSAGE CONNECTING APPARATUS FOR A MACHINE TOOL

(75) Inventor: Osamu Tanigawa, Konan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/801,660

(22) Filed: Mar. 9, 2001

(30) Foreign Application Priority Data

Jul. 13, 2000 (JP) .......................................... 2000-212971

(51) Int. Cl.⁷ ................................................. F16I 55/00

(52) U.S. Cl. ........................................ 141/384; 285/276

(58) Field of Search ................................. 141/383, 384, 141/385, 386; 285/275, 276, 277, 278, 279, 280, 281

(56) References Cited

U.S. PATENT DOCUMENTS 3,889,983 A * 6/1975 Freize et al. ................... 285/13

FOREIGN PATENT DOCUMENTS

JP 8-155783 6/1996

* cited by examiner

Primary Examiner—Charles R. Eloshway
Assistant Examiner—Peter deVore
(74) Attorney, Agent, or Firm—Oliff & Berridge, PLC

(57) ABSTRACT

A proximal end of a coolant nozzle is inserted into a large-diameter portion provided at an end of a shaft's coolant passage. The coolant nozzle is urged toward the distal end thereof, by a coil spring, and is prevented from coming out, by a stopper screw. Provided at the distal end face of the coolant nozzle is an O-ring, as a sealing member, that contacts to the periphery of an opening to a coolant passage of a tool holder. The O-ring may be easily replaced because the O-ring can be removed together with the coolant nozzle after the removal of the stopper screw.

21 Claims, 4 Drawing Sheets

COOLANT PASSAGE CONNECTING APPARATUS FOR A MACHINE TOOL

BACKGROUND OF THE INVENTION

1. Field of Invention

The invention relates to a coolant passage connecting apparatus in a machine tool that connects coolant passages for supplying coolant fluid to a tool. More particularly, the invention relates to the coolant passage connecting apparatus that fluid-tightly connects a shaft's coolant passage formed on a main shaft, and a tool's coolant passage formed on a tool at an end of the main shaft.

2. Description of Related Art

A known machine tool is structured to eject pressurized coolant fluid from a tip of a tool, which is attached to a main shaft, for cooling and lubricating a workpiece, as well as for removing cutting chips. To eject coolant fluid to a workpiece from an end of a coolant passage formed on a tool, a fluid-tight connection needs to be established between a shaft's coolant passage formed on the main shaft and the tool's coolant passage formed on the tool at an end of the main shaft, wherein the tool's coolant passage includes a coolant passage formed on a tool holder that fixedly holds the tool and is removably mounted on the main shaft.

For the fluid-tight connection between the shaft's coolant passage and the tool's coolant passage, a known machine tool has an O-ring or packing/stuffing on the main shaft. For example, when the tool holder is mounted on the main shaft, the O-ring or packing/stuffing presses around the periphery of an opening of the coolant passage in the tool holder. Thus, the coolant passages in the main shaft and the tool holder are fluid-tightly connected using the O-ring or packing/stuffing provided at the main shaft.

However, a sealing member, such as the O-ring and packing/stuffing, which is used for a long period, may sometimes allow coolant fluid to leak out, due to the wear and tear thereof. In this case, the sealing member needs to be replaced. However, in the above-described tool machine it is very difficult to replace the sealing member. For example, Japanese Laid-Open Patent Publication No. 8-155783 discloses the replacement of the O-ring fitted on the inner surface of a coolant supply member at an end thereof, including a coolant passage formed on the main shaft, by removing a detachable member screwed on an end of the coolant supply member. However, the end of the coolant supply member, where the O-ring is fitted, is disposed fairly inward from an end of a housing for the main shaft. Therefore, the replacement of the O-ring at the remote position is difficult and troublesome.

SUMMARY OF THE INVENTION

One aspect of the invention is to provide a coolant passage connecting apparatus in a machine tool, the machine tool having a main shaft formed with a shaft's coolant passage for supplying coolant fluid for a tool attached to a distal end of the main shaft, the shaft's coolant passage fluid-tightly connecting to a coolant passage formed on the tool, wherein a sealing member prevents coolant fluid leakage by pressing a periphery of an opening to the tool's coolant passage, that is easily replaced.

According to one aspect of the invention, a coolant passage connecting apparatus is provided in a machine tool. The machine tool has a main shaft formed with a shaft's coolant passage for supplying coolant fluid for a tool attached to a distal end of the main shaft. The shaft's coolant passage fluid-tightly connects to a tool's coolant passage formed on the tool. The coolant passage connecting apparatus may include a sealing member that prevents coolant fluid from leaking outwardly from a connecting portion between the shaft's coolant passage and the tool's coolant passage, and a coolant nozzle detachably attached to the distal end of the main shaft. The coolant nozzle is formed with a hollow to be connected to the shaft's coolant passage and to the tool's coolant passage while the tool is mounted on the main shaft. The coolant nozzle detachably attaches the sealing member to the periphery of an opening to the shaft's coolant passage. The sealing member is pressed against a periphery of an opening of the coolant passage of the tool by the coolant nozzle.

In the coolant passage connecting apparatus of the invention, the sealing member is pressed against the periphery of the opening to the tool's coolant passage when the tool is attached to the main shaft, preventing coolant fluid from leaking outwardly from the connecting portion between the shaft's coolant passage and the tool's coolant passage. The sealing member is attached to the coolant nozzle. The coolant nozzle is detachable from the distal end of the main shaft. This structure enables the sealing member and the coolant nozzle to be easily removed together.

The hollow is formed in the coolant nozzle. The hollow is connected to the shaft's coolant passage and to the tool's coolant passage while the tool is mounted on the main shaft. In the coolant passage connecting apparatus, the shaft's coolant passage and the tool's coolant passage may be fluid-tightly connected with the aid of the sealing member. In addition, the sealing member is removed from the main shaft together with the coolant nozzle, as described above. This enables a user to replace the sealing member with a new one close at hand. If the coolant passage connecting apparatus is applied to a machine tool, coolant fluid leakage may be prevented in the main shaft, and the ease of maintenance improves.

A proximal end of the coolant nozzle is fluid-tightly and slidably inserted into the shaft's coolant passage. The coolant passage connecting apparatus may further include an urging member that urges the coolant nozzle toward a distal end of the main shaft, and a stopper member that is removably fixed to the main shaft and that stops the coolant nozzle on a side of the distal end of the main shaft by engagement therewith, so that the coolant nozzle is prevented from coming out toward the distal end of the main shaft.

In the coolant passage connecting apparatus, the proximal end of the coolant nozzle is fluid-tightly and slidably inserted into the shaft's coolant passage. The coolant nozzle inserted into the shaft's coolant passage is urged by the urging member toward the distal end of the main shaft, so that the sealing member is favorably pressed against the periphery of the opening to the tool's coolant passage, by an urging force of the urging member, especially when the sealing member is provided at the distal end of the coolant nozzle. Thus, coolant fluid leakage may be effectively prevented.

The stopper member is removably fixed to the main shaft against the urging force, stopping the coolant nozzle on a side of the distal end of the main shaft. When the stopper member is engaged with the main shaft, the coolant nozzle is prevented from coming out by the urging force toward the distal end of the main shaft. As the stopper member is removed from the main shaft, the coolant nozzle may easily be removed therefrom. In this structure, coolant fluid leakage may be effectively prevented and the sealing member, which is attached to the coolant nozzle, may be easily replaced.

When the stopper member is removed from the main shaft, the coolant nozzle and the urging member can be removed together from the main shaft on a side of the distal end thereof.

Because the coolant nozzle and the urging member can be removed together from the main shaft on the side of the distal end thereof, upon the removal of the stopper member from the main shaft, the urging member, such as a spring, may be replaced easily, in the cases where the urging member needs to be replaced due to the deterioration thereof with time. This structure enables the urging member to be easily replaced, leading to the improvement in the ease of maintenance for a machine tool.

The urging member is disposed outside of the coolant nozzle. When the urging member, such as a spring, is disposed inside of the coolant passage, the urging member may be subjected to corrosion by the coolant fluid. In the coolant passage connecting apparatus of the invention, the urging member is disposed outside of the coolant nozzle, so that the urging member will not be subjected to corrosion by the coolant fluid. For example, when a spring is used as the urging member, the spring conventionally needs to be made of a material having an excellent corrosion resistance, such as stainless steel (SUS), to prevent the corrosion of the spring by coolant fluid. However, a spring made of widely-used low-cost materials, such as steel, can be used in the coolant passage connecting apparatus of the invention, because the spring will not be subjected to corrosion by the coolant fluid. Thus, the manufacturing cost is reduced while the corrosion of the urging member is prevented.

The proximal end of the coolant nozzle is fluid-tightly and slidably inserted into the shaft's coolant passage. The coolant passage connecting apparatus may further include a second sealing member provided in a vicinity of the proximal end of the coolant nozzle. The second sealing member retains a fluid-tightness between an inner wall of the shaft's coolant passage and an outer periphery of the coolant nozzle.

When the proximal end of the coolant nozzle is fluid-tightly and slidably inserted into the shaft's coolant passage, it is preferable that a sealing member is provided to retain the fluid-tightness between the inner wall of the shaft's coolant passage and the outer periphery of the coolant nozzle. Such a sealing member may prevent coolant fluid from leaking out at the proximal end of the coolant nozzle, so that the second sealing member is provided in the coolant passage connecting apparatus. The second sealing member may be removed from the main shaft together with the coolant nozzle when the coolant nozzle is removed from the main shaft.

By removing the second sealing member from the main shaft together with the coolant nozzle, the second sealing member may be replaced with new one close at hand, similarly as the sealing member is replaced. In the coolant passage connecting apparatus of the invention, coolant fluid leakage may be effectively prevented and the ease of maintenance in a machine tool improves.

BRIEF DESCRIPTION OF THE DRAWINGS

Preferred embodiments of the invention will be described in detail with reference to the following figures wherein.

DETAILED DESCRIPTION OF PREFERRED EMBODIMENTS

Figure 1:
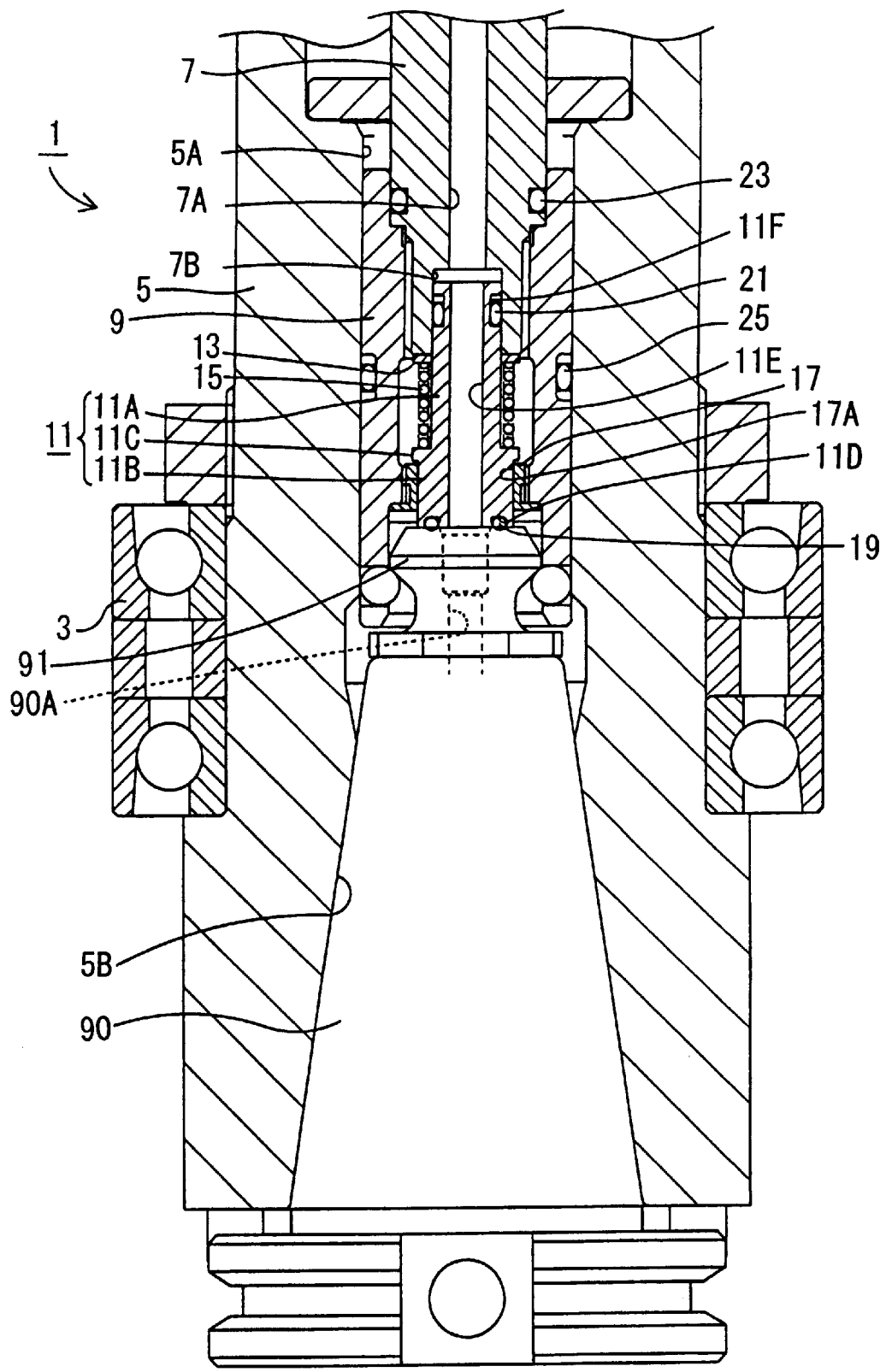
FIG. 1 is a sectional view of a main shaft near one end thereof to which a coolant passage connecting apparatus according to an embodiment of the invention is applied.

Preferred embodiments of the invention will be described in detail with reference to the figures. FIG. 1 shows a sectional view of a main shaft 1 near one end thereof to which a coolant passage connecting apparatus according to an embodiment of the invention is applied. A housing (not shown) for the main shaft 1 is provided with a spindle 5 that is rotatably supported through a bearing 3. The spindle 5 has a shaft through hole 5A extending along the central axis of the spindle 5. On the side of the distal end (lower side in FIG. 1) of the shaft through hole 5A, the spindle 5 has a tool attachment hole 5B, the longitudinal cross section as shown in FIG. 1 having a trapezoidal shape. The tool attachment hole 5B, is structured so as to mount therein a tool holder 90 fixedly holding a tool (not shown). A pull stud 91 of the tool holder 90, which is seated in the tool attachment hole 5B, is fixed to the spindle 5 by a known collet (not shown), so as to integrally rotate with the spindle 5.

A coolant supply member 7 is provided, so as to pass through a substantially central portion of the shaft through hole 5A. In the coolant supply member 7, a shaft's coolant passage 7A is formed. A supporting member 9 is provided between the outer surface of the coolant supply member 7 at the distal end thereof, and the inner wall of the shaft through hole 5A. The supporting member 9 is connected by a screw with the coolant supply member 7. The supporting member 9 can slide together with the coolant supply member 7 relative to the spindle 5 in the thrust (axial) directions.

Formed at the end of the shaft's coolant passage 7A is a large-diameter portion 7B into which a proximal end portion 11A (upper end portion in FIG. 1) of a coolant nozzle 11 can be inserted. A distal end portion 11B of the coolant nozzle 11 is larger in diameter than the proximal end portion 11A of the nozzle 11, and smaller in diameter than the proximal end face of the pull stud 91. Formed on the distal end portion 11B, on the side of the proximal end thereof, is a flanged portion 11C which is larger in diameter than the distal end portion 11B. A coil spring 15, as an urging member, is compressingly provided between the flanged portion 11C and a washer 13, provided at the distal end face of the coolant supply member 7. The coolant nozzle 11 is engaged with a stopper screw 17, as a stopper member, which prevents the coolant nozzle 11 from coming out in the direction of the distal end of the spindle 5 (to the lower side in FIG. 1).

The outer surface of the stopper screw 17 is screwed on the inner wall of the supporting member 9 near the distal end thereof. The stopper screw 17 has a hole 17A in the substantially central portion thereof. The distal end portion 11B of the coolant nozzle 11 is slidably inserted into the hole 17A. The diameter of the hole 17A is smaller than that of the flange portion 11C. The stopper screw 17, engaged with the supporting member 9, prevents the coolant nozzle 11 from coming out, as described above, against an urging force of the coil spring 15. The distal end face of the coolant nozzle 11 makes contact with the proximal end face of the pull stud 91, by the above-described urging force of the coil spring 15. In the distal end face of the coolant nozzle 11, a ring-shaped groove 11D is formed. The ring-shaped groove 11D surrounds the outer circumference of an opening of a coolant passage 90A in the tool holder 90. An O-ring 19, as a sealing member, is fitted within the ring-shaped groove 11D.

Formed in the substantially central portion of the coolant nozzle 11 is a hollow 11E that connects the coolant passage 90A of the tool holder 90 and the shaft's coolant passage 7A. A recess 11F is formed on the outer surface of the coolant nozzle 11 at the proximal end thereof. Fitted within the recess 11F is an O-ring 21, as a second sealing member, that retains fluid-tightness between the large-diameter portion 7B of the shaft's coolant passage 7A and the outer surface of the coolant nozzle 11. Fitted over the outer surface of the coolant supply member 7 is an O-ring 23 that retains the fluid-tightness between the outer surface of the coolant supply member 7 and the supporting member 9. Fitted over the outer surface of the supporting member 9 is an O-ring 25 that retains the fluid-tightness between the outer surface of the supporting member 9 and the shaft through hole 5A.

The tool holder 90 is inserted into the tool attachment hole 5B and fixed by the above-described collet. The O-ring 19 is pressed against the proximal surface of the pull stud 91, adjacent the opening to the coolant passage 90A of the tool holder 90, by the urging force of the coil spring 15. The O-ring 19 prevents coolant fluid from leaking outwardly from the opening. The shaft's coolant passage 7A and the coolant passage 90A of the tool holder 90 are fluid-tightly connected, through the hollow 11E of the coolant nozzle 11.

Thus, coolant fluid fed through the shaft's coolant passage 7A can be effectively ejected from a tip of the tool without leaking. In addition, leakage of coolant fluid can be prevented more effectively by the O-ring 21 provided between the outer surface of the coolant nozzle 11 and the large-diameter portion 7B of the shaft's coolant passage 7A.

When the tool holder 90 is removed from the tool attachment hole 5B and, then, the stopper screw 17 is removed from the supporting member 9 using a specific tool, the coolant nozzle 11 can be removed together with the O-ring 19, the coil spring 15, the washer 13, and the O-ring 21. A user can easily replace the O-rings 19, 21 and the coil spring 15 with new ones close at hand. For example, the O-rings 19, 21 are removed from the coolant nozzle 11, using a needle or pin. Then, new O-rings 19, 21 are fitted within the ring-shaped groove 11D and the recess 11F, respectively. Thereafter, a new coil spring 15 is inserted over the coolant nozzle 11. The coolant nozzle 11 with new O-rings 19, 21 and the coil spring 15 mounted, may be set in the supporting member 9.

Thereafter, the stopper screw 17 is engaged with the supporting member 9 to prevent the coolant nozzle 11 from coming out. Thus, the replacement of the O-rings 19, 21 and the coil spring 15 is completed. The operations of attaching or removing the coolant nozzle 11 and the stopper screw 17 become easier, if the supporting member 9 and the coolant supply member 7 are slid to the side of the distal end of the main shaft 1, as much as possible. In such a machine tool that includes the main shaft 1 of the embodiment, the ease of maintenance is greatly improved. In addition, the coil spring 15 is not subjected to corrosion by coolant fluid, because the coil spring 15 is inserted over the outer surface of the coolant nozzle 11. Therefore, widely-used low-cost materials, such as steel, can be used for the coil spring 15, leading to a manufacturing cost reduction while corrosion of the coil spring 15 is prevented.

Machine tools are generally provided with a plurality of the tool holders for each tool. In the above-described embodiment, the sealing member is not necessarily provided for each of the tool holders, so that system costs will not increase.

Figure 2:
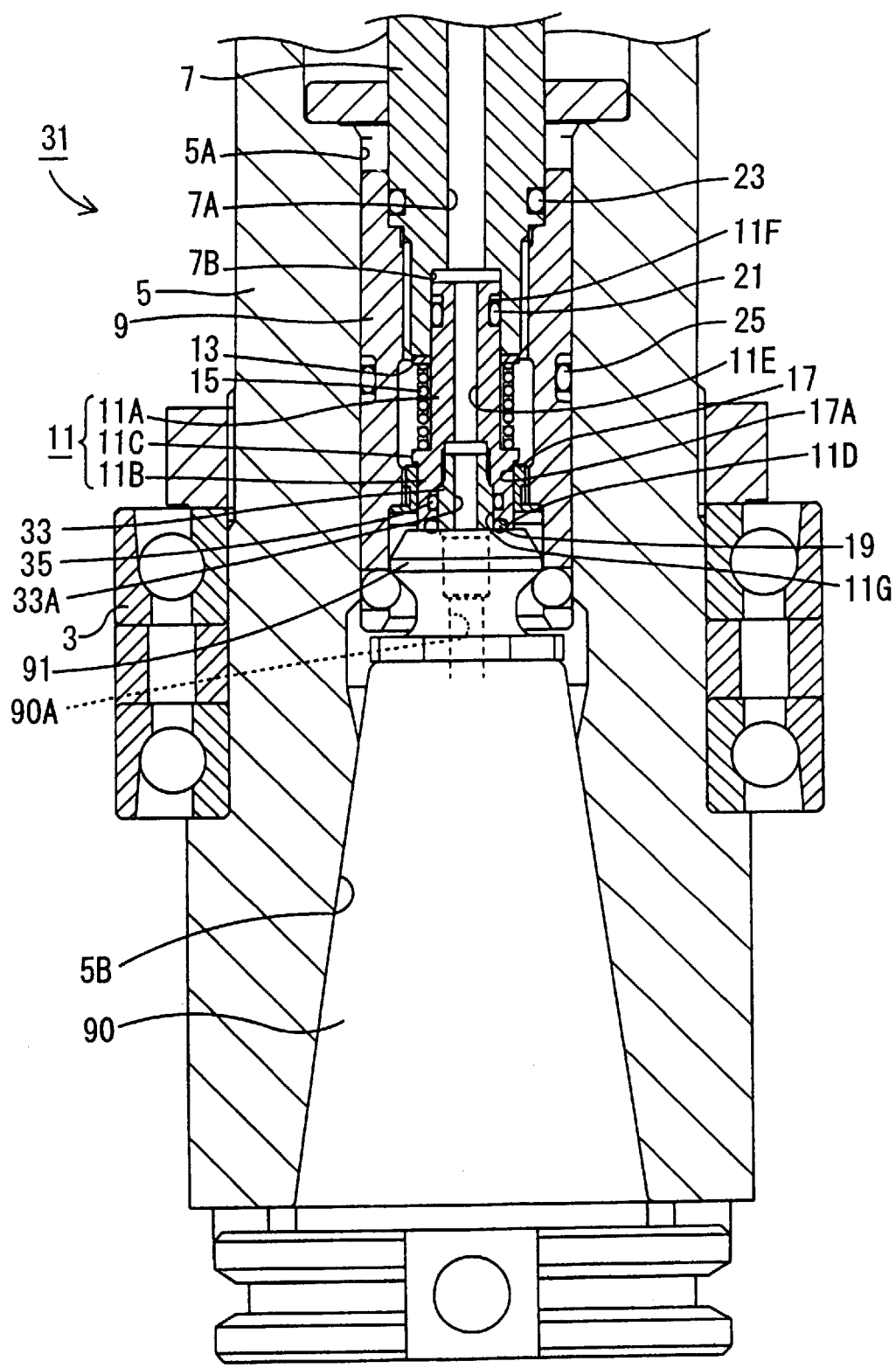
FIG. 2 is a sectional view of the main shaft near one end thereof in a modification of the embodiment.
Figure 3:
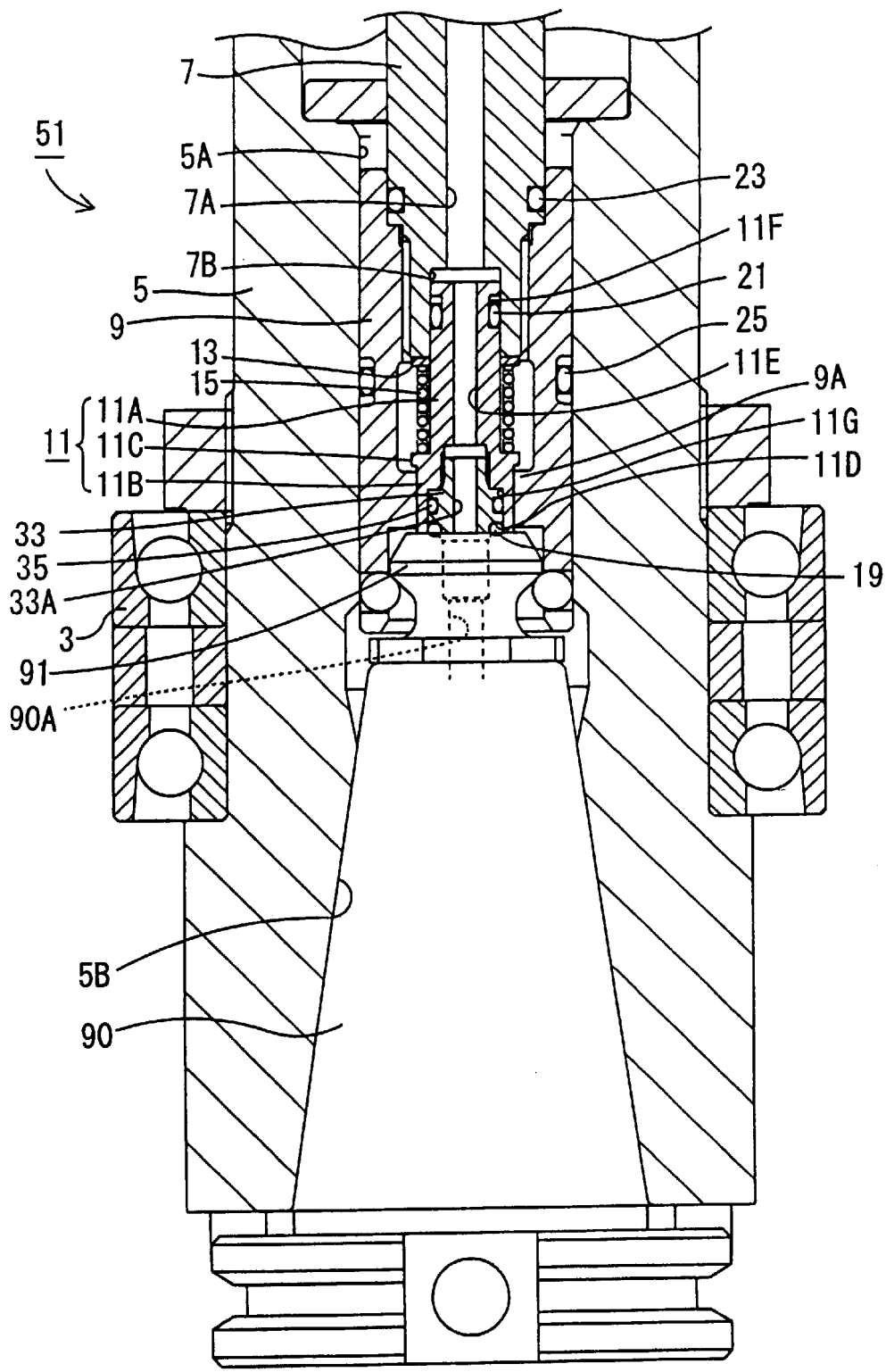
FIG. 3 is a sectional view of the main shaft near one end thereof in another modification of the embodiment.
Figure 4:
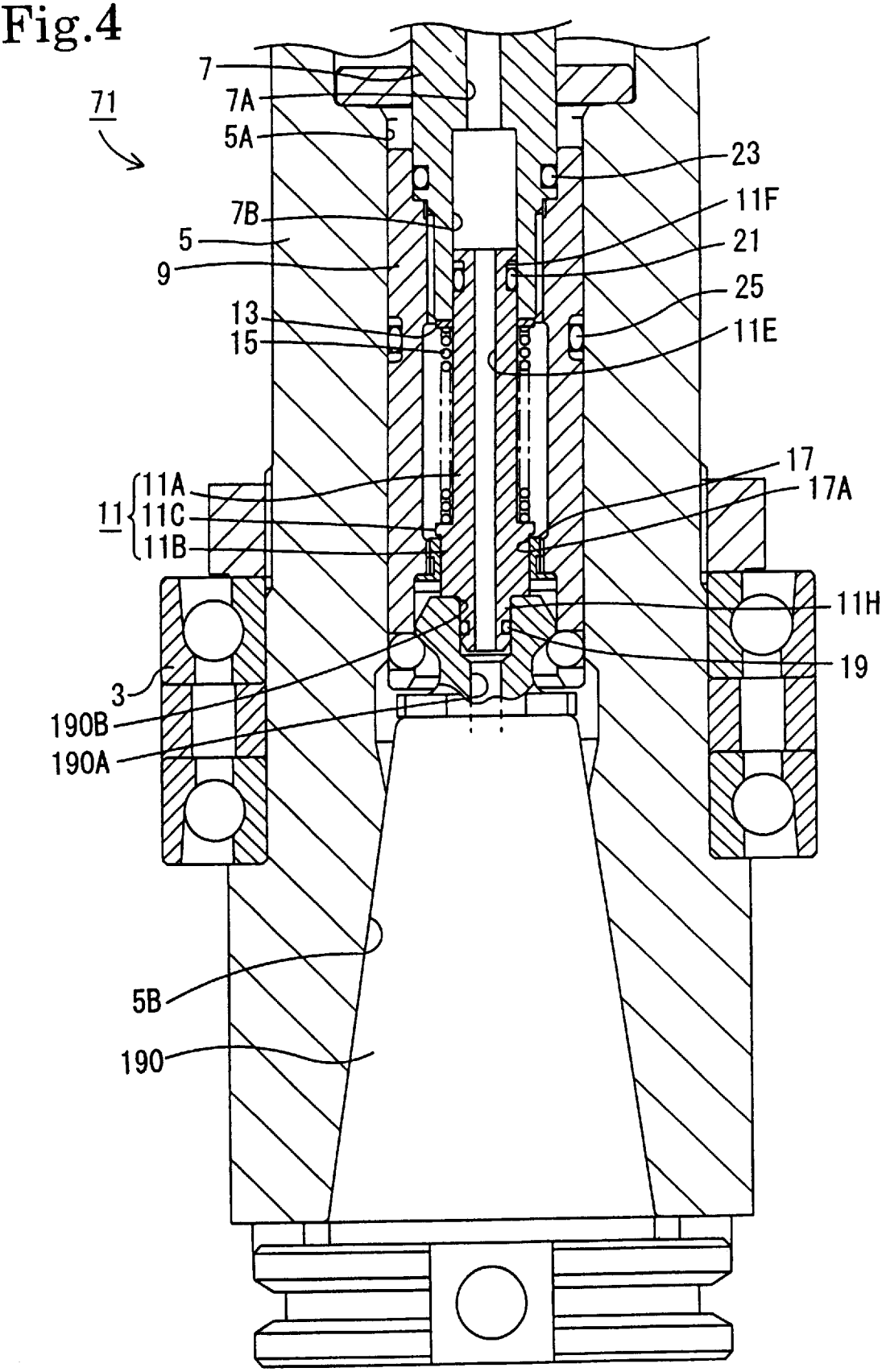
FIG. 4 is a sectional view of the main shaft near one end thereof in a further modification of the embodiment.

Modifications of the main shaft 1 will be described with reference to FIGS. 2 to 4. It is to be noted that the reference numerals in FIG. 1 designate similar components shown in FIGS. 2 to 4, and a detailed explanation thereof with respect to FIGS. 2 to 4 is omitted. The reference numerals in FIG. 2 also designate similar components shown in FIGS. 3 and 4 and, so again, a detailed explanation thereof is omitted.

In a main shaft 31 shown in FIG. 2, a screw hole 11G is formed in the inner surface of the ring-shaped groove 11D at the distal end portion 11B of the coolant nozzle 11. A detachable member 33 is screwed into the screw hole 11G. The detachable member 33 is provided with a hollow 33A having the same diameter as that of the hollow 11E, so as to connect the hollow 11E of the coolant nozzle 11 and the coolant passage 90A of the tool holder 90. Fitted on the inner wall of the screw hole 11G is an O-ring 35 that retains the fluid-tightness between the outer surface of the detachable member 33 and the coolant nozzle 11.

In the thus structured main shaft 31, when the O-ring 19 is replaced with new one, the coolant nozzle 11 is first removed, as described above. Then, the detachable member 33 is removed from the coolant nozzle 11. The O-ring 19 is fitted between the outer surface of the detachable member 33 and the ring-shaped groove 11D. Thus, the O-ring 19 is easily replaced.

Differences between the coolant nozzle 11 of the main shaft 51 shown in FIG. 3 and the coolant nozzle 11 of the main shaft 31 in FIG. 2, will be described below. In the shaft 51, the ring-shaped groove 11D is formed on the detachable member 33. The O-ring 35 is fixed to the detachable member 33. The stopper screw 17 is not employed for the main shaft 51. Instead, a stopper portion 9A, which has substantially the same cross-sectional profile as the stopper screw 17, is integrally formed with the supporting member 9 near the distal end thereof.

In the above-described main shaft 51, the replacement of the coil spring 15 requires the disassembly of the shaft 51 from the proximal end thereof. The O-rings 19, 35 are removed together with the detachable member 33 when the tool holder 90 is removed from the tool attachment hole 5B and then the detachable member 33 is removed from the coolant nozzle 11. Therefore, the O-rings 19, 35 may be easily replaced, as described above in the embodiments employing the main shaft 31. The coil spring 15 is inserted over the outer surface of the coolant nozzle 11, so that the coil spring 15 will not be subjected to corrosion with coolant fluid, as described above in the embodiments employing the main shafts 1, 31.

In above-described embodiments, the O-ring 19 contacts the proximal end face of the pull stud 91. However, the O-ring 19, as provided in a main shaft 71 shown in FIG. 4, may contact the inner wall of a coolant passage 190A of a tool holder 190. As shown in FIG. 4, the coolant passage 190a of the tool holder 190 has a large-diameter portion 190B at the proximal end thereof. The coolant nozzle 11 of the main shaft 71 has a protrusion 11H at the distal end thereof. The protrusion 11H is engaged with the large-diameter portion 190B. The O-ring 19 is fitted over the outer surface of the protrusion 11H.

As described above, the O-ring 19 may be provided so as to contact the proximal end face of the pull stud 91, or so as to contact the inner wall of the coolant passage 190A of the tool holder 190. However, the effect of urging the coolant nozzle 11 by the coil spring 15 is more noticeable in the former case, that is, when the O-ring 19 is provided at the distal end of the coolant nozzle 11, so as to press against the proximal end face of the pull stud 91.

While the invention has been described with reference to the embodiments, it is to be understood that the invention is not restricted to the particular forms shown in the foregoing embodiments. Various modifications and alterations can be made thereto without departing from the scope of the invention.

For example, although the foregoing embodiments employ an O-ring as a sealing member, a packing or stuffing may be used. In the above-described embodiments, a coil spring is used as an urging member. However, a rubber or elastic material, or a plate spring may also be used. Further, the urging member may not be necessarily provided. For example, a member similar to the detachable member 33 shown in FIG. 3 may be directly provided at the end of the coolant supply member 7.

What is claimed is:

1. A coolant passage connecting apparatus in a machine tool, the machine tool having a main shaft formed with a shaft's coolant passage for supplying coolant fluid for a tool to be attached to a distal end of the main shaft, the shaft's coolant passage fluid-tightly connecting to a tool's coolant passage formed on the tool, comprising:

a sealing member that prevents coolant fluid from leaking outwardly from a connecting portion between the shaft's coolant passage and the tool's coolant passage; and a coolant nozzle detachably attached to the distal end of the main shaft, the coolant nozzle being formed with a hollow to be connected to the shaft's coolant passage and to the tool's coolant passage while the tool is mounted on the main shaft, the coolant nozzle detachably attaching the sealing member to a periphery of an opening to the shaft's coolant passage, the sealing member being pressed against a periphery of an opening to the tool's coolant passage of the tool by the coolant nozzle, wherein a proximal end of the coolant nozzle is fluid-tightly and slidably inserted into the shaft's coolant passage, and the coolant passage connecting apparatus further comprises:

an urging member that urges the coolant nozzle toward a distal end of the main shaft; and a stopper member that is removably fixed to the main shaft and that stops the coolant nozzle on a side of the distal end of the main shaft by engagement therewith, so that the coolant nozzle can be prevented from coming out toward the distal end of the main shaft.

2. The coolant passage connecting apparatus according to claim 1, wherein when the stopper member is removed from the main shaft, the coolant nozzle and the urging member can be removed together from the main shaft on a side of the distal end thereof.

3. The coolant passage connecting apparatus according to claim 1, wherein the urging member is disposed outside of the coolant nozzle.

4. The coolant passage connecting apparatus according to claim 1, wherein the sealing member contacts a proximal end face of the tool.

5. The coolant passage connecting apparatus according to claim 1, wherein the proximal end of the coolant nozzle is fluid-tightly and slidably inserted into the shaft's coolant passage, and the coolant passage connecting apparatus further comprises a second sealing member provided in a vicinity of the proximal end of the coolant nozzle, the second sealing member retaining a fluid-tightness between an inner wall of the shaft's coolant passage and an outer periphery of the coolant nozzle.

6. The coolant passage connecting apparatus according to claim 1, wherein the coolant nozzle includes a fixing member that detachably fixes the sealing member to the coolant nozzle.

7. The coolant passage connecting apparatus according to claim 1, wherein the coolant nozzle is screwed on the main shaft.

8. The coolant passage connecting apparatus according to claim 1, wherein the sealing member contacts an inner wall of the tool's coolant passage.

9. The coolant passage connecting apparatus according to claim 1, wherein the sealing member has a ring shape surrounding the shaft's coolant passage.

10. A coolant passage connection between a coolant passage in a main shaft and a coolant passage through a tool holder, comprising:

a coolant nozzle linking the coolant passage in the main shaft and the coolant passage through the tool holder;

a sealant member removably mounted to the coolant nozzle opposing the tool holder; and means for causing the sealant member to engage a periphery of the coolant passage through the tool holder to form a leak proof seal, wherein the means for causing comprises an urging member that urges the coolant nozzle toward a distal end of the main shaft; and the coolant passage connection further comprises:

a support structure that is mounted in the main shaft that includes means to stop the coolant nozzle on a side of the distal end of the main shaft by engagement therewith, so that the coolant nozzle is prevented from coming out toward the distal end of the main shaft.

11. The coolant passage connection according to claim 10, wherein the urging member is a spring mounted over the coolant nozzle and engaged between a flange on an outer surface of the coolant nozzle and a lip in the support structure.

12. The coolant passage connection according to claim 10, wherein the coolant passage in the main shaft passes through the support structure and the coolant nozzle mounted in the support structure.

13. The coolant passage connection according to claim 12, further comprising a stopper screw threadably engaged in the support structure, the coolant nozzle passing through a hole in the stopper screw, the stopper screw and a flange on the outer surface of the coolant nozzle retaining the coolant nozzle in the support structure.

14. The coolant passage connection according to claim 13, further comprising a detachable member received in an end of the coolant nozzle, the sealant member mounted between the coolant nozzle and the detachable member.

15. The coolant passage connection according to claim 14, wherein the detachable member has a circumferential groove and further comprising a second sealing member mounted in the circumferential groove.

16. The coolant passage connection according to claim 13, wherein the detachable member has a circumferential groove and further comprising a second sealing member mounted in the circumferential groove.

17. The coolant passage connection according to claim 12, further comprising a detachable member received in an end of the coolant nozzle, the sealant member mounted between the coolant nozzle and the detachable member.

18. The coolant passage connection according to claim 12, wherein the support structure has a stopper portion and the coolant nozzle has a flange extending from an outer surface, the stopper portion and the flange retaining the coolant nozzle in the support structure.

19. The coolant passage connection according to claim 10, wherein the tool holder has an enlarged opening leading to the coolant passage and the coolant nozzle has an end received in the enlarged opening.

20. The coolant passage connection according to claim 19, wherein the sealant member is received in a groove in the end of the coolant nozzle and contacts a wall of the enlarged opening in the tool holder.

21. The coolant passage connection according to claim 10, wherein the sealant member is mounted to an end of the coolant nozzle and opposes an end surface of the tool holder.

* * * * *